United States Patent
Volkovs et al.

(10) Patent No.: US 12,462,525 B2
(45) Date of Patent: Nov. 4, 2025

(54) CO-LEARNING OBJECT AND RELATIONSHIP DETECTION WITH DENSITY AWARE LOSS

(71) Applicant: THE TORONTO-DOMINION BANK, Toronto (CA)

(72) Inventors: Maksims Volkovs, Toronto (CA); Cheng Chang, Toronto (CA); Guangwei Yu, Toronto (CA); Himanshu Rai, Toronto (CA); Yichao Lu, Toronto (CA)

(73) Assignee: The Toronto-Dominion Bank, Toronto (CA)

( * ) Notice: Subject to any disclaimer, the term of this patent is extended or adjusted under 35 U.S.C. 154(b) by 586 days.

(21) Appl. No.: 17/969,505

(22) Filed: Oct. 19, 2022

(65) Prior Publication Data

US 2023/0131935 A1 Apr. 27, 2023

Related U.S. Application Data

(60) Provisional application No. 63/270,416, filed on Oct. 21, 2021.

(51) Int. Cl.
*G06V 10/764* (2022.01)
*G06V 10/77* (2022.01)
*G06V 10/774* (2022.01)

(52) U.S. Cl.
CPC ........ *G06V 10/764* (2022.01); *G06V 10/7715* (2022.01); *G06V 10/774* (2022.01)

(58) Field of Classification Search
CPC ............ G06V 10/764; G06V 10/7715; G06V 10/774; G06V 10/82; G06V 10/454;
(Continued)

(56) References Cited

U.S. PATENT DOCUMENTS 10,262,214 B1 * 4/2019 Kim ...................... G06N 3/045
10,269,125 B1 * 4/2019 Kim ...................... G06T 7/277
(Continued)

FOREIGN PATENT DOCUMENTS

| CN | 111462282 A | 7/2020 |
| CN | 113065587 A | 7/2021 |
| CN | 113240033 A | 8/2021 |

OTHER PUBLICATIONS

International Search Report and Written Opinion issued in PCT/CA2022/051546 on Jan. 1, 2023; 9 pages.
(Continued)

*Primary Examiner* — Michael S Osinski
(74) *Attorney, Agent, or Firm* — Patent Capital Group

(57) ABSTRACT

An object detection model and relationship prediction model are jointly trained with parameters that may be updated through a joint backbone. The offset detection model predicts object locations based on keypoint detection, such as a heatmap local peak, enabling disambiguation of objects. The relationship prediction model may predict a relationship between detected objects and be trained with a joint loss with the object detection model. The loss may include terms for object connectedness and model confidence, enabling training to focus first on highly-connected objects and later on lower-confidence items.

20 Claims, 5 Drawing Sheets

(58) Field of Classification Search
CPC ........ G06V 20/41; G06V 20/52; G06V 20/70; G06V 20/46; G06V 10/25; G06V 10/255; G06V 20/20; G06V 20/44; G06V 30/274; G06V 20/647; G06N 3/045; G06N 3/08; G06N 3/04; G06N 3/084; G06N 3/048; G06N 20/00; G06N 3/044; G06N 20/10; G06T 2207/20081; G06T 2207/20084; G06T 7/11; G06T 2207/10016; G06T 2207/10024; G06T 19/20; G06T 2207/20016; G06T 7/246; G06F 18/214; G06F 18/2431; G06F 18/217; G06F 18/2413; G06F 16/5854; G06F 18/211
See application file for complete search history.

(56) References Cited

U.S. PATENT DOCUMENTS

| | | | |
|---|---|---|---|
| 10,789,288 B1* | 9/2020 | Ranzinger | G06T 7/70 |
| 11,188,794 B2* | 11/2021 | Yao | G06V 10/82 |
| 11,537,811 B2* | 12/2022 | Shen | G06V 20/58 |
| 11,580,333 B2* | 2/2023 | Bondugula | G06V 10/7747 |
| 11,943,184 B2* | 3/2024 | Back | H04L 51/224 |
| 12,175,384 B2* | 12/2024 | Wu | G06N 3/0455 |
| 2015/0248586 A1* | 9/2015 | Gaidon | G06V 20/40 382/103 |
| 2015/0294192 A1* | 10/2015 | Lan | G06F 18/2413 382/159 |
| 2016/0378861 A1* | 12/2016 | Eledath | G06V 20/52 707/766 |
| 2017/0308753 A1* | 10/2017 | Wu | G06T 7/90 |
| 2017/0330059 A1* | 11/2017 | Novotny | G06V 10/7515 |
| 2017/0344884 A1* | 11/2017 | Lin | G06N 3/048 |
| 2018/0025249 A1* | 1/2018 | Liu | G06V 10/255 382/158 |
| 2019/0073524 A1* | 3/2019 | Yi | G06V 10/454 |
| 2019/0073553 A1* | 3/2019 | Yao | G06N 3/082 |
| 2019/0095716 A1* | 3/2019 | Shrestha | G08B 21/187 |
| 2019/0102658 A1* | 4/2019 | Wang | G06N 3/08 |
| 2019/0279045 A1* | 9/2019 | Li | G06V 10/82 |
| 2020/0086879 A1* | 3/2020 | Lakshmi Narayanan | G06V 20/597 |
| 2020/0134375 A1* | 4/2020 | Zhan | G06V 30/19173 |
| 2020/0143169 A1* | 5/2020 | Vaezi Joze | G06N 3/088 |
| 2020/0160087 A1* | 5/2020 | Redmon | G06V 10/82 |
| 2020/0302230 A1* | 9/2020 | Chang | G06F 18/214 |
| 2020/0356842 A1* | 11/2020 | Guo | G06V 20/20 |
| 2021/0089841 A1* | 3/2021 | Mithun | G06T 7/90 |
| 2021/0103776 A1* | 4/2021 | Jiang | G06T 19/20 |
| 2021/0124993 A1* | 4/2021 | Singh | G06F 18/2451 |
| 2021/0192194 A1* | 6/2021 | Chi | G06N 3/02 |
| 2021/0256588 A1* | 8/2021 | Moosaei | G06Q 30/0631 |
| 2021/0264557 A1* | 8/2021 | Mao | G06T 1/20 |
| 2021/0295155 A1* | 9/2021 | Vijayakumar | G06F 18/214 |
| 2021/0319242 A1* | 10/2021 | Cholakkal | G06V 10/454 |
| 2022/0076002 A1* | 3/2022 | Luo | G06T 7/246 |
| 2022/0157048 A1* | 5/2022 | Ting | G06V 10/82 |
| 2022/0157054 A1* | 5/2022 | Lin | G06V 20/20 |
| 2022/0231979 A1* | 7/2022 | Back | H04L 51/10 |
| 2022/0382553 A1* | 12/2022 | Li | G06N 3/02 |
| 2023/0021551 A1* | 1/2023 | Lu | G06V 10/764 |
| 2023/0030987 A1* | 2/2023 | Townsend | G06V 20/52 |
| 2023/0177835 A1* | 6/2023 | Griffin | G06V 20/70 382/159 |
| 2024/0161461 A1* | 5/2024 | Zu | G06N 3/04 |
| 2024/0221426 A1* | 7/2024 | Xu | G06V 20/52 |

OTHER PUBLICATIONS

Bengio, et al., "Representation Learning: A Review and New Perspectives," IEEE Transactions on Pattern Analysis and Machine Intelligence, arXiv preprint arXiv:1206.5538v3 [cs.LG] Apr. 23, 2014, 30 pages; https://arxiv.org/pdf/1206.5538.

Carion, et al., "End-to-End Object Detection with Transformers," arXiv:2005.12872v3 [cs.CV], May 28, 2020, 26 pages; https://arxiv.org/pdf/2005.12872.pdf.

Chen, et al., "Counterfactual Critic Multi-Agent Training for Scene Graph Generation," IEEE/CVF International Conference on Computer Vision, 2019, 11 pages; https://openaccess.thecvf.com/content_ICCV_2019/papers/Chen_Counterfactual_Critic_Multi-Agent_Training_for_Scene_Graph_Generation_ICCV_2019_paper.pdf.

Chen, et al., "Knowledge-Embedded Routing Network for Scene Graph Generation," IEEE/CVF Conference on Computer Vision and Pattern Recognition, 2019, 9 pages; https://openaccess.thecvf.com/content_CVPR_2019/papers/Chen_KnowledgeEmbedded_Routing_Network_for_Scene_Graph_Generation_CVPR_2019_paper.pdf.

Dai, et al., "Detecting Visual Relationships with Deep Relational Networks," IEEE conference on computer vision and Pattern recognition, 2017, 11 pages; https://openaccess.thecvf.com/content_cvpr_2017/papers/Dai_Detecting_Visual_Relationships_CVPR_2017_paper.pdf.

Deng, et al., "ImageNet: A Large-Scale Hierarchical Image Database," IEEE conference on computer vision and pattern recognition, Jun. 20, 2009, 8 pages; https://projet.liris.cnrs.fr/imagine/pub/proceedings/CVPR-2009/data/papers/0103.pdf.

Everingham, et al., "The PASCAL Visual Object Classes (VOC) Challenge," International journal of computer vision, vol. 88, No. 2, Sep. 9, 2009, 36 pages; http://citeseerx.ist.psu.edu/viewdoc/download?doi=10.1.1.167.6629&rep=rep1&type=pdf.

He, et al., "Deep Residual Learning for Image Recognition," IEEE conference on computer vision and pattern recognition, 2016, 9 pages; https://openaccess.thecvf.com/content_cvpr_2016/papers/He_Deep_Residual_Learning_CVPR_2016_paper.pdf.

Krishna, et al., "Visual Genome: Connecting Language and Vision Using Crowdsourced Dense Image Annotations," International journal of computer vision, vol. 123, No., 1, Feb. 6, 2017, 42 pages; https://link.springer.com/content/pdf/10.1007/s11263-016-0981-7.pdf.

Kuznetsova, et al., "The Open Images Dataset V4 Unified image classification, object detection, and visual relationship detection at scale," International Journal of Computer Vision, vol. 128, No. 7, arXiv:1811.00982v2 [cs.CV], Feb. 21, 2020, 26 pages; https://arxiv.org/pdf/1811.00982.pdf.

Law, et al., "CornerNet: Detecting Objects as Paired Keypoints," European conference on computer vision, 2018, 17 pages; https://openaccess.thecvf.com/content_ECCV_2018/papers/Hei_Law_CornerNet_Detecting_Objects_ECCV_2018_paper.pdf.

Lecun, et al., "Gradient-based learning applied to document recognition," IEEE, 86, No. 11, Dec. 1998, 47 pages; http://lushuangning.oss-cn-beijing.aliyuncs.com/CNN%E5%AD%A6%E4%B9%A0%E7%B3%BB%E5%88%97/Gradient-Based_Learning_Applied_to_Document_Recognition.pdf.

Li, et al., "VIP-CNN: Visual Phrase Guided Convolutional Neural Network," IEEE conference on computer vision and pattern recognition, 2017, 10 pages; https://openaccess.thecvf.com/content_cvpr_2017/papers/Li_ViP-CNN_Visual_Phrase_CVPR_2017_paper.pdf.

Liang, et al., "Deep Variation-structured Reinforcement Learning for Visual Relationship and Attribute Detection," IEEE conference on computer vision and pattern recognition, 2017, 10 pages; https://openaccess.thecvf.com/content_cvpr_2017/papers/Liang_Deep_Variation-Structured_Reinforcement_CVPR_2017_paper.pdf.

Lin, et al., "Focal Loss for Dense Object Detection," IEEE international conference on computer vision, 2017, 9 pages; https://openaccess.thecvf.com/content_ICCV_2017/papers/Lin_Focal_Loss_for_ICCV_2017_paper.pdf.

Lin, et al., "Microsoft COCO: Common Objects in Context," In European conference on computer vision, Sep. 6, 2014, 16 pages; https://link.springer.com/content/pdf/10.1007/978-3-319-10602-1_48.pdf.

Liu, et al., "ConceptNet—a practical commonsense reasoning toolkit," BT Technology Journal, vol. 22, No. 4, Oct. 2004, 16 pages; http://eridanus.cz/id32402/jazyk/jazykove%282da/aplikovana%281_lingvistika/Ontologie/WordNet/ConceptNet/ConceptNet-BTTJ.pdf.

Liu, et al., "SSD: Single Shot MultiBox Detector," European conference on computer vision, arXiv: 1512.02325v5 [cs.CV], Dec.

(56) References Cited

OTHER PUBLICATIONS 29, 2016, 17 pages; http://www.cs.toronto.edu/~bonner/courses/2020s/csc2547/papers/discriminative/object-detection/ssd,-liu,-eccv-2016.pdf.

Lu, et al., "Learning Effective Visual Relationship Detector on 1 GPU," arXiv:1912.06185v1 [cs.CV], Dec. 12, 2019, 8 pages; https://arxiv.org/pdf/1912.06185.pdf.

Lu, et al., "Visual Relationship Detection with Language Priors," European conference on computer vision, Oct. 8, 2016, 19 pages; https://www-cs.stanford.edu/people/ranjaykrishna/vrd/vrd.pdf.

Newell, et al., "Pixels to Graphs by Associative Embedding," Advances in neural information processing systems 30, 2017, 10 pages; https://proceedings.neurips.cc/paper/2017/file/84438b7aae55a0638073ef798e50b4ef-Paper.pdf.

Qi, et al., "Attentive Relational Networks for Mapping Images to Scene Graphs," IEEE/CVF Conference on Computer Vision and Pattern Recognition, 2019, 10 pages; https://openaccess.thecvf.com/content_CVPR_2019/papers/Qi_Attentive_Relational_Networks_for_Mapping_Images_to_Scene_Graphs_CVPR_2019_paper.pdf.

Ren, et al., "Faster R-CNN: Towards Real-Time Object Detection with Region Proposal Networks," Advances in neural information processing systems, vol. 28, 2015, 9 pages; https://proceedings.neurips.cc/paper/2015/file/14bfa6bb14875e45bba028a21ed38046-Paper.pdf.

Simonyan, et al., "Very Deep Convolutional Networks For Large-Scale Image Recognition," arXiv: 1409.1556v6 [cs.CV], Apr. 2, 2015, 14 pages; https://arxiv.org/pdf/1409.1556.pdf%E3%80%82.

Tai, et al., "Improved Semantic Representations From Tree-Structured Long Short-Term Memory Networks," arXiv:1503.00075v3 [cs.CL], May 30, 2015, 11 pages; https:/arxiv.org/pdf/1503.00075.pdf?ref=https://codemonkey.link.

Tang, et al., "Learning to Compose Dynamic Tree Structures for Visual Contexts," IEEE/CVF conference on computer vision and pattern recognition, 2019, 10 pages; https://openaccess.thecvf.com/content_CVPR_2019/papers/Tang_Learning_to_Compose_Dynamic_Tree_Structures_for_Visual_Contexts_CVPR_2019_paper.pdf.

Tang, et al., "Unbiased Scene Graph Generation from Biased Training," IEEE/CVF conference on computer vision and pattern recognition, 2020, 10 pages; https://openaccess.thecvf.com/content_CVPR_2020/papers/Tang_Unbiased_Scene_Graph_Generation_From_Biased_Training_CVPR_2020_paper.pdf.

Tian, et al., "FCOS: Fully Convolutional One-Stage Object Detection," IEEE/CVF international conference on computer vision, 2019, 10 pages; https://openaccess.thecvf.com/content_ICCV_2019/papers/Tian_FCOS_Fully_Convolutional_One-Stage_Object_Detection_ICCV_2019_paper.pdf.

Wang, et al., "Sketching Image Gist: Human-Mimetic Hierarchical Scene Graph Generation," arXiv:2007.08760v1 [cs.CV], Jul. 17, 2020, 30 pages; https://arxiv.org/pdf/2007.08760.pdf.

Xu, et al., "Reasoning-RCNN: Unifying Adaptive Global Reasoning into Large-scale Object Detection," IEEE/CVF Conference on Computer Vision and Pattern Recognition, 2019, 10 pages; https://openaccess.thecvf.com/content_CVPR_2019/papers/Xu_Reasoning-RCNN_Unifying_Adaptive_Global_Reasoning_Into_Large-Scale_Object_Detection_CVPR_2019_paper.pdf.

Yin, et al., "Zoom-Net: Mining Deep Feature Interactions for Visual Relationship Recognition," European Conference on Computer Vision (ECCV), 2018, 17 pages; https://openaccess.thecvf.com/content_ECCV_2018/papers/Guojun_Yin_Zoom-Net_Mining_Deep_ECCV_2018_paper.pdf.

Yu, et al., "Visual Relationship Detection with Internal and External Linguistic Knowledge Distillation," IEEE International conference on computer vision, 2017, 9 pages; https://openaccess.thecvf.com/content_ICCV_2017/papers/Yu_Visual_Relationship_Detection_ICCV_2017_paper.pdf.

Zareian, et al., "Bridging Knowledge Graphs to Generate Scene Graphs," arXiv:2001.02314v4 [cs.CV], Jul. 18, 2020, 29 pages; https://arxiv.org/pdf/2001.02314.pdf.

Zellers, et al., "Neural Motifs: Scene Graph Parsing with Global Context," IEEE conference on computer vision and pattern recognition, 2018, 10 pages; https://openaccess.thecvf.com/content_cvpr_2018/papers/Zellers_Neural_Motifs_Scene_CVPR_2018_paper.pdf.

Zhang, et al., "Graphical Contrastive Losses for Scene Graph Parsing," IEEE/CVF Conference on Computer Vision and Pattern Recognition, 2019, 9 pages; https://openaccess.thecvf.com/content_CVPR_2019/papers/Zhang_Graphical_Contrastive_Losses_for_Scene_Graph_Parsing_CVPR_2019_paper.pdf.

Zhang, et al., "PPR-FCN: Weakly Supervised Visual Relation Detection via Parallel Pairwise R-FCN," IEEE International conference on computer vision, 2017, 9 pages; https://openaccess.thecvf.com/content_ICCV_2017/papers/Zhang_PPR-FCN_Weakly_Supervised_ICCV_2017_paper.pdf.

Zhang, et al., "Visual Translation Embedding Network for Visual Relation Detection," In Proceedings of the IEEE conference on computer vision and pattern recognition, 2017, 9 pages; https://openaccess.thecvf.com/content_cvpr_2017/papers/Zhang_Visual_Translation_Embedding_CVPR_2017_paper.pdf.

Zhao, et al., "Collaborative Training between Region Proposal Localization and Classification for Domain Adaptive Object Detection," arXiv:2009.08119v2 [cs.CV], Sep. 18, 2020, 16 pages; https://arxiv.org/pdf/2009.08119.pdf?ref=https://githubhelp.com.

Zhou, et al., "Objects as points," arXiv:1904.07850v2 [cs.CV], Apr. 25, 2019, 12 pages; https://arxiv.org/pdf/1904.07850.pdf%EF%BC%9B%E5%9B%9E%E5%BD%923%E4%B8%AA%E7%82%B9%EF%BC%8C%E5%B7%A6%E4%B8%8A%EF%BC%80%E5%8F%B3%E4%B8%8B%EF%BC%80%E4%B8%AD%E5%BF%83%E7%82%B9.

Zhuang, et al., "Towards Context-aware Interaction Recognition for Visual Relationship Detection," IEEE International conference on computer vision, 2017, 10 pages; https://openaccess.thecvf.com/content_ICCV_2017/ papers/Zhuang_Towards_Context-Aware_Interaction_ICCV_2017_paper.pdf.

* cited by examiner

CO-LEARNING OBJECT AND RELATIONSHIP DETECTION WITH DENSITY AWARE LOSS

CROSS-REFERENCE TO RELATED APPLICATION

This application claims the benefit of provisional U.S. application No. 63/270,416, filed Oct. 21, 2021, the contents of which is incorporated herein by reference in its entirety.

BACKGROUND

This disclosure relates generally to automated image analysis, and more particularly to object detection and relationship prediction between objects.

Automated image analysis is typically performed sequentially, treating object detection and relationship detection as separate, discrete tasks. Where object detection may identify where an object is in an image, such as its position and boundaries (often defined as a "bounding box") along with a predicted class, relationship prediction describes relationships between objects, such as a man "wearing" a hat, or a man "standing on" a sidewalk. Though detecting objects is important for many image processing tasks, detecting relationships between objects can be essential for more nuanced understandings of a scene in an image, for example to better predict an intention of actors in the scene.

However, approaches that have separately optimized object detection and relationship prediction has failed to benefit from cross-learning between the two domains. Typically, such cross-learning could also be difficult because object detection is often separated into different stages, for example to first identify a number of regions of interest, many of which may overlap, and then to predict object classifications for regions, which may reduce the number of regions that are considered as having objects. This separation of stages (and others like it) has prevented object and relationship models from effective joint training as model parameters may not effectively be propagated through the models.

Separate optimization has a significant disadvantage where information from the relationship model does not flow to detection, and the two models cannot co-adapt each other to maximize performance. Specifically, this can cause two problems. First, the detection model is optimized specifically for object detection and has no knowledge of the relationship task. Similarly, the relationship model uses detection predictions as fixed inputs and has no way of changing them. The two-stage approach thus prevents the models from co-adapting the other to the target task. Second, relationship labels provide additional information that is not available during the object detection phase.

SUMMARY

To provide a more effective combination of object detection and relationship classification, an object detection model and a relationship prediction model share components and may be jointly trained with a loss function that combines an object detection loss and a relationship prediction loss. To permit this combination, the object detection model is a keypoint-based model, such that the operations for object detection and relationship prediction may be fully-differentiable to a joint backbone layer that generates an initial visual feature map from which the object detection is performed. Rather than generate a plurality of bounding boxes, object detection layers may evaluate the likely presence of an object based on an object heatmap, such that a peak of the heatmap for a particular object class represents an object center, which may naturally lead to a single keypoint for each object. The particular boundaries of the object may then be determined based on corresponding offset and size layers that generate values for the detected object point.

To detect objects, further features may be developed based on the visual feature map from which a relation feature map may be determined that describes features for evaluation of relationship information. The identified objects from the object heatmap may then be used to look up the corresponding location of the relation feature map to obtain object relationship features, which may also include the predicted classification of the object from the object heatmap. This architecture enables the object detection and relationship prediction to work closely together based on similar features, and in some embodiments may enable joint training of the processing layers back through the joint backbone layers to the image.

In addition, parameters of the object detection layers and the relationship prediction layers may be jointly trained based on a loss function that may include a loss for the object classification and for the relationship prediction. The loss component for the relationship prediction loss may also adjust the weight of a loss based on the "density" of the related objects, such that objects with a higher number of object relationships may be assigned a higher weight in training. Similarly, the prediction loss may also be weighted by the respective prediction confidence, such that lower-confidence predictions have higher effects on the propagated gradients than higher-confidence items. These losses may work together such that the loss initially focuses on low-confidence high-connected objects, which may decrease in weight as the confidence increases. Together, these aspects enable the object detection and relationship prediction to jointly learn relevant parameters end-to-end (e.g., with fully-differentiable operations) and improve both object detection and relationship predictions.

Empirical analysis on public benchmarks with this architecture and loss demonstrate significant gains with over 13% improvement over leading baselines on difficult scene graph detection tasks.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Architecture Overview

Figure 1:
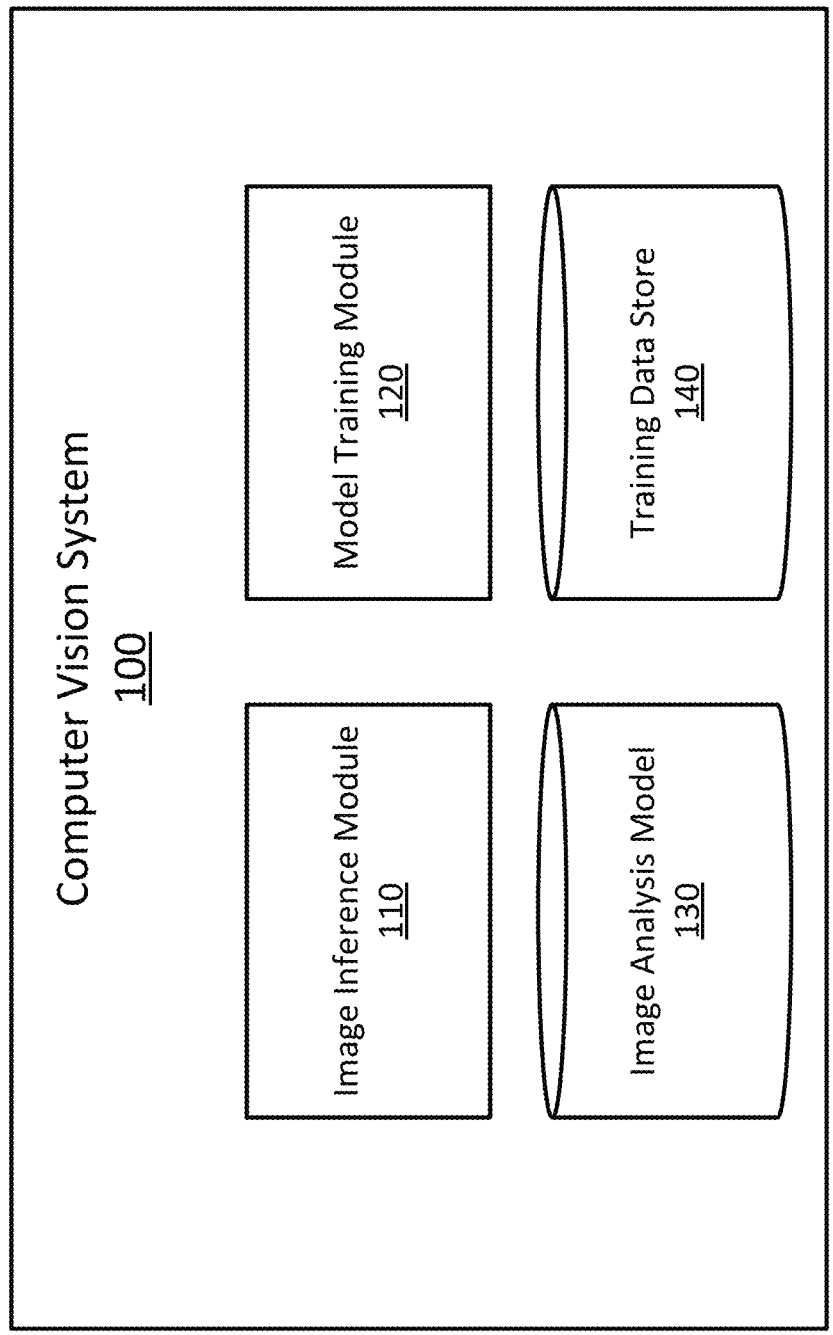
FIG. 1 illustrates an example computer vision system, according to one embodiment.

FIG. 1 illustrates an example computer vision system 100, according to one embodiment. The computer vision system 100 may include various modules and data stores for recognizing objects in an image and predicting the relationships between them. The object recognition and relationship prediction may be performed by an image analysis model 130 that is a trained computer model having parameters describing operations for processing an image to identify the location of objects in the image along with object classification and relationship prediction. The image analysis model 130 includes object recognition and relationship prediction as part of a single model that may be trained end-to-end, enabling the object recognition and relationship prediction to jointly learn relevant characteristics from the other. Individual layers of the image analysis model 130 may include various type of machine-learned layers, including various types of convolutional layers, pooling layers, etc., that perform operations for processing an input image as further discussed below. An input image is typically represented as a set of pixels across a height and width, each image having a value in a set of color channels, which are typically channels corresponding to a red-green-blue color space, although other color space or image formatting representations may also be used that may have a different number of channels or image representation. As such, the input image I may formally be described as having dimensions across width, height, and the color channels (here, three): $I \in \mathbb{R}^{W \times H \times 3}$. Typically, positions across the width and height of the image (or a data layer in the model) may be referred to x and y coordinates, respectively.

The model training module 120 trains the parameters of the image analysis model 130 based on a set of training data in training data store 140. The training data store 140 includes a set of images and associated objects each having a related object class and relationships between the objects that may be defined as one of several relationship classes, which may include "no relationship." During training, the model training module 120 applies the image analysis model 130 according to its current parameters and may determine a loss based on the model's prediction of objects' position, size, and class, as well as the predicted relationship between pairs of objects.

Figure 2:
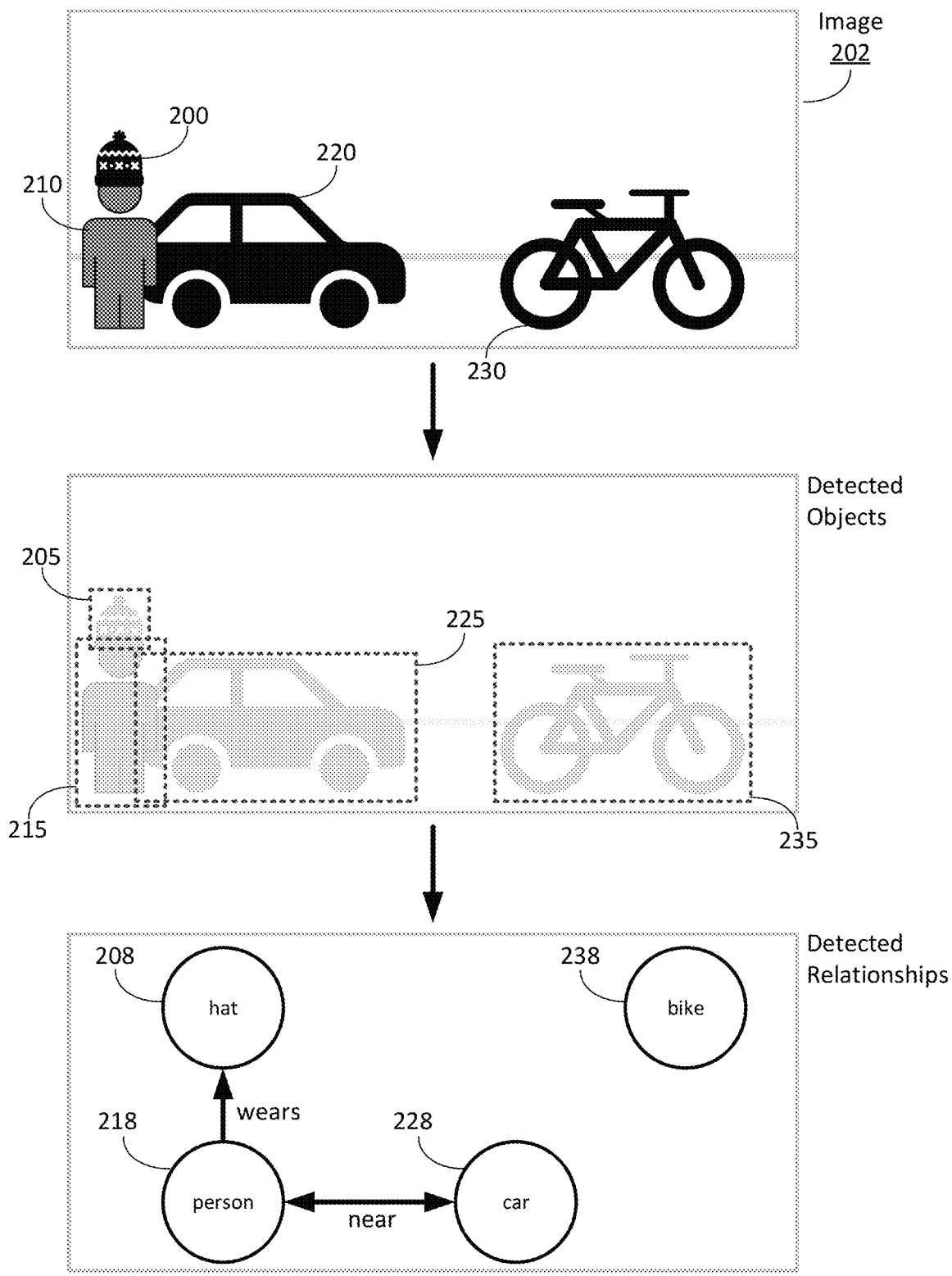
FIG. 2 shows example objects and relationships that may be determined from an image, according to one embodiment.

FIG. 2 shows example objects and relationships that may be determined from an image 202, according to one embodiment. The example of FIG. 2 may be an example of a training image with an associated set of objects to be detected and relationships between them to be learned by the image analysis model 130. In the example of FIG. 2, the image 202 includes objects that may readily be interpreted by a human as a hat 200, person 210, car 220, and bike 230. One objective of the object detection model is to identify the respective objects with associated bounding boxes, such an object identified as a hat object 205, person object 215, car object 225, and bike object 235, each of which has a respective bounding box. The bounding box designates an area, typically a rectangle, of corresponding x-y coordinates designating the boundaries of the object within an image. As such, each training object $\psi_i$ for an image in the training set may be associated with a pair of x-y coordinates ($x_{i1}$, $y_{i1}$, $x_{i2}$, $y_{i2}$) that may designate the corners (e.g., top left and bottom right) of the bounding box for the object in the image, along with an object class for the object $c_i^o \in \{1, \ldots, C^o\}$, where $C^o$ indicates the total number of object classes. As such, each of the objects in the training set for the image has respective bounding boxes as shown in FIG. 2 and a respective object class (e.g., object classes corresponding to "hat," "person," "car," etc.). One objective of the image analysis model 130 is thus to learn to detect objects in an image and identify the respective object class and location (e.g., a bounding box) of the object in the image.

In conjunction with the detected objects, the image analysis model 130 is also trained to detect relationships between objects, represented here as an object graph in which edges between objects (nodes) indicate a relationship class between them, and no edge represents the relationship class of "no relationship." In some embodiments, the relationships may be directional, such that relationships may have a particular subject and object of the relationship representing the acting object and the acted-on object, respectively. In the example of FIG. 2, a node for the person 218 has a relationship class of "wears" with respect to the "hat" object 208, such that the person is the "object" and the hat is the "subject" of the relationship class. The directionality of the relationship may thus enable the relationship to be described as "person wears hat" to represent respective subject and object of the relationship class. Other types of relationships may also be bi-directional, such that each object may properly be considered both the subject and object of the relationship class, such as the "near" relationship (i.e., one object "is near" another) between the person object 218 and the car object 228. As such, the model may be trained to consider the "near" relationship class as correct when the person object 218 or the car object 228 are the subject or object for this relationship class, such that "person is near car" or "car is near person" may both be training objectives for detection in the image 202. Finally, the bike object 238 in this example may have the relationship class of "no relationship" for all other objects, and the hat object 208 and car object 228 may also have the "no relationship" class. Accordingly, in the training data for a particular image, the objects may also be associated with particular relationships as a triplet, identifying a first object (as the relationship subject), second object (as the relationship object), and the relationship between them. This may formally be designated the triplet ($\psi_i$, $c_{ij}^r$, $\psi_j$) for respective items $\psi_i$ and with a relationship class for the pair $c_{ij}^r$, in which the relationship class is one of a set of relationship classes $c_{ij}^r \in \{1, \ldots, C^r\}$ having a number $C^r$ of relationship classes.

As such, the training data for an image may specify the objects to be detected in the image along with the respective relationship classes among them. Similarly, when applied to new images (e.g., when using the model for inference), the model may be applied to detect objects and the relationships between them based on the parameters of the model learned during model training.

Returning to FIG. 1, the image inference module 110 may receive images and apply the image analysis model 130 to detect objects and relationships between them. The image inference module 110 may receive images from other computing systems or may receive images from imaging sensors connected with the computer vision system 100. Embodiments of the computer vision system 100 and use of the image analysis model 130 may vary as object recognition and relationship tasks are applicable to many different applications. For example, the image analysis model 130 may be applied to automatically label and tag images of an image repository, such as an online photo storage for a family album, using the labels and relationships to help a user in searching for images in the repository. As another example, the image analysis model 130 may be used as part of a perception system to interpret images from an imaging sensor, such as on an automated vehicle or aerial drone, to identify objects and relationships within the environment of the perception system. As such, while this disclosure particularly relates to the image analysis model 130, the model may be trained on various types of image data for different types of objects and relationships. Similarly, the trained image analysis model 130 may be deployed to another system for execution of the model for local interpretation of images captured by the other system. As another example, images may be sent to the computer vision system 100 for analysis, the image inference module 110 may receive the image, apply the image analysis model 130, and return a set of detected objects and relationships for the image to a requestor. As such, the computer vison system 100 and/or the image analysis model 130 may be used in different configurations and with more and/or fewer components than those shown in FIG. 1.

Figure 3:
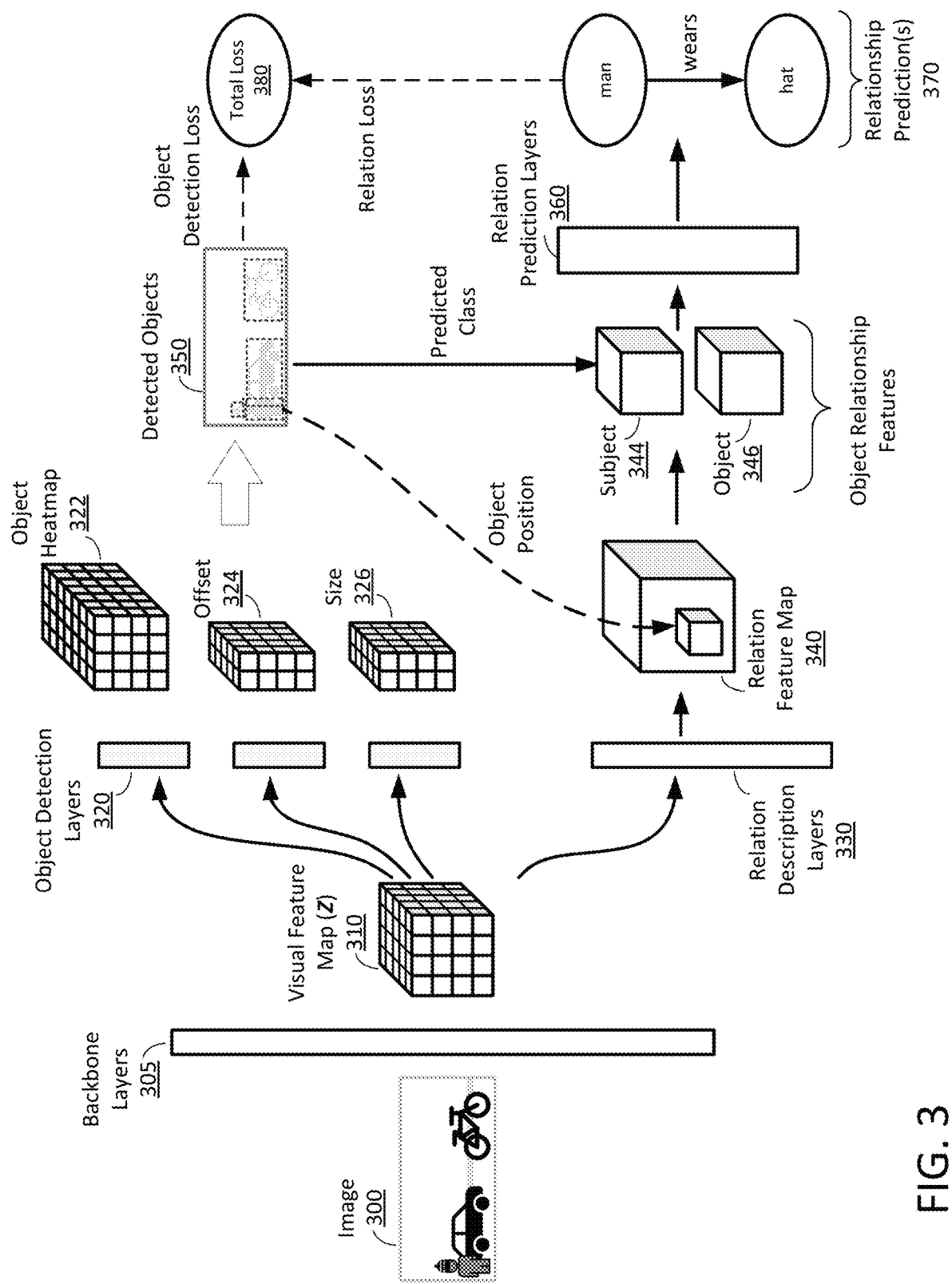
FIG. 3 shows a model architecture for an image analysis model, according to one embodiment.

FIG. 3 shows a model architecture for an image analysis model, according to one embodiment. The model architecture may generate, for an image 300, a set of detected objects 350 and relationship prediction(s) 370 between the objects using a model having parameters that may be jointly trained. To effectively combine training of parameters for object detection and relationship prediction branches, the model in one embodiment includes parameters that may be trained end-to-end, such that gradients may pass through the object detection branch as well as the relationship prediction branch, and in some embodiments may further train parameters of backbone layers 305. Though termed "branches" in one embodiment, the layers that perform these functions may also be considered an object detection model and a relationship prediction model. The object detection "branch" may include the layers used for the generation of the detected objects 350, and in the example of FIG. 3 includes the object detection layers 320 and respective parameters that identify the position of objects in the image 300. Similarly, the relationship prediction "branch" may include the layers used for the relationship prediction, and in the example of FIG. 3, may include relation prediction layers 360 and relation description layers 330. In the example of FIG. 3, both the object detection and relationship prediction branches may use features from the visual feature map 310 constructed by the backbone layers 305.

To enable joint training of the object detection and relationship prediction branches, the layers may be constructed of operations that are fully-differentiable, such that gradients may pass through the layers effectively. In other types of object detection models, this may not be possible as various layers may not be effectively differentiable.

As shown in FIG. 3, the object detection and relationship prediction branches may both use a joint set if backbone layers 305 for generating a visual feature map 310, also referred to as Z. The backbone layers may include various types of layers for processing the image 300 to generate a set of features positions in the image 300 resulting in the visual feature map 310, where each feature is represented by an output channel in the visual feature map 310. As such, the visual feature map 310 in one embodiment has a dimensionality of $$Z \in \mathbb{R}^{\frac{W}{R} \times \frac{H}{R} \times D^O},$$

where R is the stride (or other effective downsampling) of the backbone that reducing the height and width of the visual feature map relative to the image 300, and the number of channels in the visual feature map 310 corresponds to the number of object classes $D^O$.

The backbone layers 305 generally may perform the majority of computational processing of the image 300 and result in the set of features in the visual feature map 310 (based on the learned parameters) that may be effective for the further object detection and relationship description tasks. The backbone layers 305 may include various types of layers, such as convolution, deformable convolution, pooling, upsampling, skip, residual, normalization, activation, and other layer types and connections suitable for processing the image 300. The backbone layers 305 in various embodiments may implement known visual processing pipelines used as backbone architectures, such as an Hourglass Network, ResNet, or Deep Layer Aggregation (e.g., DLA-34) among others.

To enable the joint training of the models and differentiable operations, which may include, e.g., the joint backbone layers 305 and use of the visual feature map 310, embodiments may use an object detection model that detects objects based on a detected "keypoint" for an object that may designate an anchor or other particular feature of an object. The keypoint may also help resolve areas of the image that have a high likelihood of being of a particular class into a particular object of that class (e.g., rather than multiple instances of the class). For example, the "keypoint" may represent the center of the object, a specific corner (e.g., top left or bottom right), or another specific portion of the object.

As each object may be located based on a single point, additional features of the object, such as the related bounding box, may be determined based on the keypoint position, which may enable the respective operations to be fully-differentiable and applied in conjunction with the relationship prediction. In addition, this approach may promote a one-to-one correspondence between training data objects and potential objects detected in an image during application, such that gradients for each training object may be effectively applied to the model parameters. This is in contrast to approaches that may identify several potential bounding boxes as "possible" or "candidate" objects and then separately deduplicate and classify to determine individual objects—for which there may be no effective back-propagation with object relationships and may typically be trained in discrete stages (e.g., first trained to identify regions of interest, and second to classify or detect objects from the regions of interest).

In the example of FIG. 3, the object detection layers 320 may perform object detection with object detection layers similar to the "CenterNet" model, although other approaches that may be differentiable and trainable with the relationship prediction may also be used for generating a set of detected objects 350 along with respective positions. In this approach, a set of object detection layers 320 generate a set of matrices corresponding to an object heatmap 322, an offset 324, and a size 326. Each of the object detection layers 320 for generating the respective object detection matrices may contain layers for respective matrices and may include any suitable combination of image processing layers, such as those noted for the backbone layers 305 above. In one embodiment, these object detection layers 320 include a convolutional layer and an activation layer (e.g., a rectified linear unit (ReLU)) and particularly may include a 3×3 convolutional operation followed by a ReLU and a 1×1 convolution.

In the object detection architecture shown here, the detection of a center of a particular class of object is based on an object heatmap 322. When a position of an object is detected, its size (i.e., dimensions of its bounding box) may be determined based on the size 326 matrix, and an offset applicable to the original image resolution may be provided by the offset 324. In this paradigm, an object's location may be determined based on the object heatmap 322, which may designate the "center" of the object. As the position of the object in the object heatmap 322 may be with respect to the reduced size of the image (i.e., a reduced "resolution" of $$\frac{W}{R} \times \frac{H}{R}\Big),$$

the position of the object's bounding box may then be determined with respect to the original image 300 with the offset 324 and size 326 as discussed below.

In this approach, possible object classes are represented in the object heatmap, such that each position in the object heatmap 322 may represent the local likelihood of a keypoint (e.g., the center of an object of that class) of each of the different object classes. As such, the object heatmap 322 may be a matrix $\hat{Y}$ having dimensions $$\hat{Y} \in \mathbb{R}^{\frac{W}{R} \times \frac{H}{R} \times C^o},$$

such that each channel of the matrix represents a prediction for a respective object class $c_i$. In one embodiment, to identify individual objects in the object heatmap 322, local peaks are determined in the object heatmap for each object class. That is, to generate a one-to-one identification of objects with the objects in an image, when there are many "high-probability" positions in the object heatmap 322, the "high-probability" positions are consolidated to a single object by identifying a local class probability peak.

In one embodiment, this may be done by identifying high-probability class predictions in the object heatmap 322 (e.g., top-k or predictions higher than a threshold value) and comparing the high-probability class predictions (each having a respective position in the object heatmap 322) to predictions for that class in the object heatmap 322 of nearby (e.g., the eight surrounding positions) positions in the object heatmap 322. The high-probability class predictions are selected as a detected object 350 only when the high-probability class is surrounded by positions having lower-class predictions (e.g., the high-probability prediction in the object heatmap 322 is also a local maximum or "peak" of that class prediction). As such, although many positions may have a high-probability of a given class, comparison with nearby keypoints enables resolving the positions to individual objects and disambiguate what might otherwise erroneously be considered multiple objects while also using a differentiable approach that is compatible with joint training with the relationship prediction layers.

In the object detection layers 320 of FIG. 3, individual objects having respective classes are identified as just discussed with positions identified with respect to the object heatmap 322. The position of a detected object i in the object heatmap 322 is denoted $\tilde{p}_i$. The bounding box of the object may then be determined with respect to the detected keypoint as a size of the bounding box in the relevant dimensions (for an image, height and width) and the position of the bounding box may be adjusted similarly by an offset (e.g., in height and width). The offset may adjust the position of the bounding box with respect to the detected centerpoint (e.g., when the detected centerpoint based on the object heatmap may differ by an offset from the actual centerpoint of the bounding box). The offset may thus adjust for distortions caused by the network stride R or other downsampling of the image 300. In one embodiment, the offset 324 and size 326 are matrices holding height and width values for an object detected at a particular position, respectively represented as:

$$\hat{O} \in \mathbb{R}^{\frac{W}{R} \times \frac{H}{R} \times 2} \text{ and } \hat{S} \in \mathbb{R}^{\frac{W}{R} \times \frac{H}{R} \times 2}.$$

As such, after detecting an object having position $\tilde{p}_i$, the respective offset and size may be determined as a lookup in the respective offset $\hat{O}_{\tilde{p}_i}$ and size $\hat{S}_{\tilde{p}_i}$ matrices at the object's position $\tilde{p}_i$. In this embodiment, the bounding box for a detected object is the position $\tilde{p}_i$ adjusted by $\hat{O}_{\tilde{p}_i}$ with corners determined by the adding or subtracting of components of the size for that position $\hat{S}_{\tilde{p}_i}$. For example, the top-right corner (for coordinates increasing up and to the right) of the bounding box is determined by adding the height and width of $\hat{S}_{\tilde{p}_i}$, and the lower-left corner of the bounding box is determined by subtracting the height and width of $\hat{S}_{\tilde{p}_i}$. In this example, the offset and size values may represent values for a bounding box of an object detected at that location, irrespective of the type of object, although in other embodiments, the size and offset may be class-dependent, in which case these matrices may include additional channels for the respective object classes (which, e.g., would increase the number of channels for the respective offset and size matrices). The detected objects having respective types and bounding boxes may then be identified as the set of detected objects 350.

In training the overall computer model, one component of a total loss 380 is an object detection loss based on the object detection and provide parameter update gradients directly to the object detection layers 320. The object detection loss may include a loss for the detected object type and bounding box accuracy. In one embodiment, training of the object heatmap 322 may be performed by generating a class-specific heatmap in which each object of that particular class contributes a distribution around its center (e.g., with a Gaussian distribution centered about the object's center) that decreases away from the center of the object (e.g., a standard deviation that decreases based on the object size). In this embodiment, the object detection loss may be based on the multiple distributions for the objects in the image 300 related to the that class. The object detection loss may be combined with another loss for the relationship prediction as discussed below to form the total loss 380.

To predict relationships, the relationship detection branch may further process the image 300 with a set of relation description layers 330 that generate a set of relation features as a relation feature map 340, designated matrix V, that describes features that may be relevant to predicting relationships between objects. In one embodiment, the relation feature map 340 includes a channel for each relationship class, such that the relation feature map 340 may have dimensions corresponding to the total number of relationship classes $$D^r: V \in \mathbb{R}^{\frac{W}{R} \times \frac{H}{R} \times D^r}.$$

The relation description layers 330 may include any suitable layer types, such as convolutional layers and activation layers, for generating the further features for the relationship prediction features. These layers may include convolutional layers and activation layers, and in one embodiment is a 3×3 convolution followed by a ReLU and then a second 1×1 convolution, such that V=Conv$_2$(reLU(Conv$_1$(Z))) in which Conv$_1$ is 3×3 and Conv$_2$ is 1×1. The inputs to the relationship features may also be padded, such that a position in the relation feature map corresponds to the same position in a visual feature map (e.g., Z at $x_1$, $y_1$ corresponds to V at $x_1$, $y_1$). In other embodiments, other structures and combinations of layers with trainable parameters may be used for generating the relation feature map 340.

To predict a relationship class $c_{ij}{}^r$ between two objects $\psi_i$ and $\psi_j$, such as a relationship subject 344 and relationship object 346, each object is represented for the relationship prediction with a set of object relationship features. First, the object relationship features may include the respective features from the relation feature map 340 at the position of the detected object $V_{\hat{p}_i}$, such that the position of the detected object may then provide a "lookup" to a position in the relation feature map 340. In one example, the number of dimensions corresponds to the number of relationship classes, such that $V_{\hat{p}_i} \in \mathbb{R}^{D^r}$. In addition to the features from the relation feature map, the object relationship features may also include the predicted class of the object, along with the predicted likelihood of the class. When the predicted class is provided with a likelihood, the likelihood may correspond to the value of the object's position in the heatmap matrix $\hat{Y}$ at the channel $c_i{}^o$ corresponding to the predicted class: $\hat{Y}_{\hat{p}_i, c_i{}^o}$. As such, the predicted class likelihood in one embodiment may be given as:

$$P(c_i{}^o|\psi_i) = \hat{Y}_{\hat{p}_i, c_i{}^o}$$

In other embodiments, other information may be used to provide a class likelihood $P(c_i{}^o|\psi_i)$ of the determined class for each object.

In addition to the features from the relation feature map and the predicted class likelihood, additional features may be included in the object relationship features to represent the objects for evaluation as subject 344 and object 346 of the relationship prediction. Particularly, additional features may be included that describe statistics of how frequently certain object relationships appear for certain types of objects. Additional semantic and/or spatial information may also be included in the object relationship features. To predict relationship classes, the respective object relationship features for the subject 344 and object 346 (i.e., to evaluate the objects as the "subject" or "object" for particular relationship types) may be input to the relationship prediction layers 360. The respective object relationship features may be concatenated or otherwise combined in a way that preserves order between the objects (e.g., as subject and object) for evaluation by the relation prediction layers 360.

The relation prediction layers 360 may include suitable layers for predicting a set of relationship classes for the objects based on the object relationship features. These may include, for example, fully-connected and activation layers for processing the object relationship features and predicting output classes. A normalization (e.g., softmax) layer may be applied before output to normalize the relationship class predictions. As such, the likelihood of a particular relationship class $c^r$ given a subject $\psi_i$ and object $\psi_j$ may be provided in one embodiment as:

$$P(c_{ij}{}^r|\psi_i,\psi_j) = \text{Softmax}(FC_2(\text{ReLU}(FC_1([\psi_i,\psi_j])))) \qquad \text{Equation 2}$$

In the example architecture of Equation 2, the relation prediction layers 360 include a first fully-connected layer $FC_1$, then a rectified linear unit activation layer (ReLU), followed by a second fully connected layer $FC_2$ to the output relationship classes. The highest-predicted relationship class may then be a relationship prediction 370 for the respective subject 344 and object 346.

In some embodiments, the relationship may also be evaluated with respect to the joint probabilities of the objects along with the relationships among them, such that the probability of the correctly-predicted object classes, along with the relationship classes may be evaluated:

$$P(\psi_i,c_{ij}{}^r,\psi_j) = P(c_{ij}{}^r|\psi_i,\psi_j)P(c_i{}^o|\psi_i)P(c_j{}^o|\psi_j) \qquad \text{Equation 3}$$

In Equation 3, the relationship probability may thus be evaluated as a probability of the triplet of object classes and the relationship between them, such that the relationship probability relatively decreases when the predicted likelihood of the constituent object classes decreases.

In training the model, a component of the total loss 380 may thus include aspects from the relationship branch according to predicted relationship classes. In some embodiments, the loss may be based on the triplet probability shown in FIG. 3, such that gradients from the relation loss may also influence and encourage modification of parameters for the object classes (e.g., as the class probabilities may be obtained from the object heatmap). The model training is further discussed below.

To use the entire model in inference, the image may be processed to detect objects with the object detection branch, in which keypoints (e.g., detecting the center of an object) may be used to predict the position of an object of a class, such as with the local peaks of the object heatmap 322 shown in FIG. 3. As discussed above, other approaches and layers for detecting objects may also be used (i.e., that may effectively be trained with the relationship branch). This may yield a set of detected objects 350. To evaluate object relationships, the respective object relationship features are generated for each detected object. Pairs of objects may then be formed, in which each object may then be evaluated as the subject and also as the object for the prediction of relationship classes. In one embodiment, the detected objects 350 and the highest-predicted relationship class based on the relation prediction layers 360 may be output as the objects and relationships detected by the model. In other embodiments, joint probability of the objects and the relationship may be evaluated (e.g., according to Equation 3). In these embodiments, triplets of subject, object, and relationship may be output based on the prediction of the respective classes as well as the relationship between them. In the embodiment using the joint probability, the output relationships may be less likely to output relationships for objects that have relatively lower class likelihoods, even when the relationship class may have a relatively predicted high likelihood. This may inhibit the identification of a relationship such as "person holds cat" when the probability of the class "cat" is relatively low. Similarly, when the model has a relatively high class probability with a modest relationship class probability, the model may overall be more confident of that triplet than situations in which the object classes is low.

Figure 4:
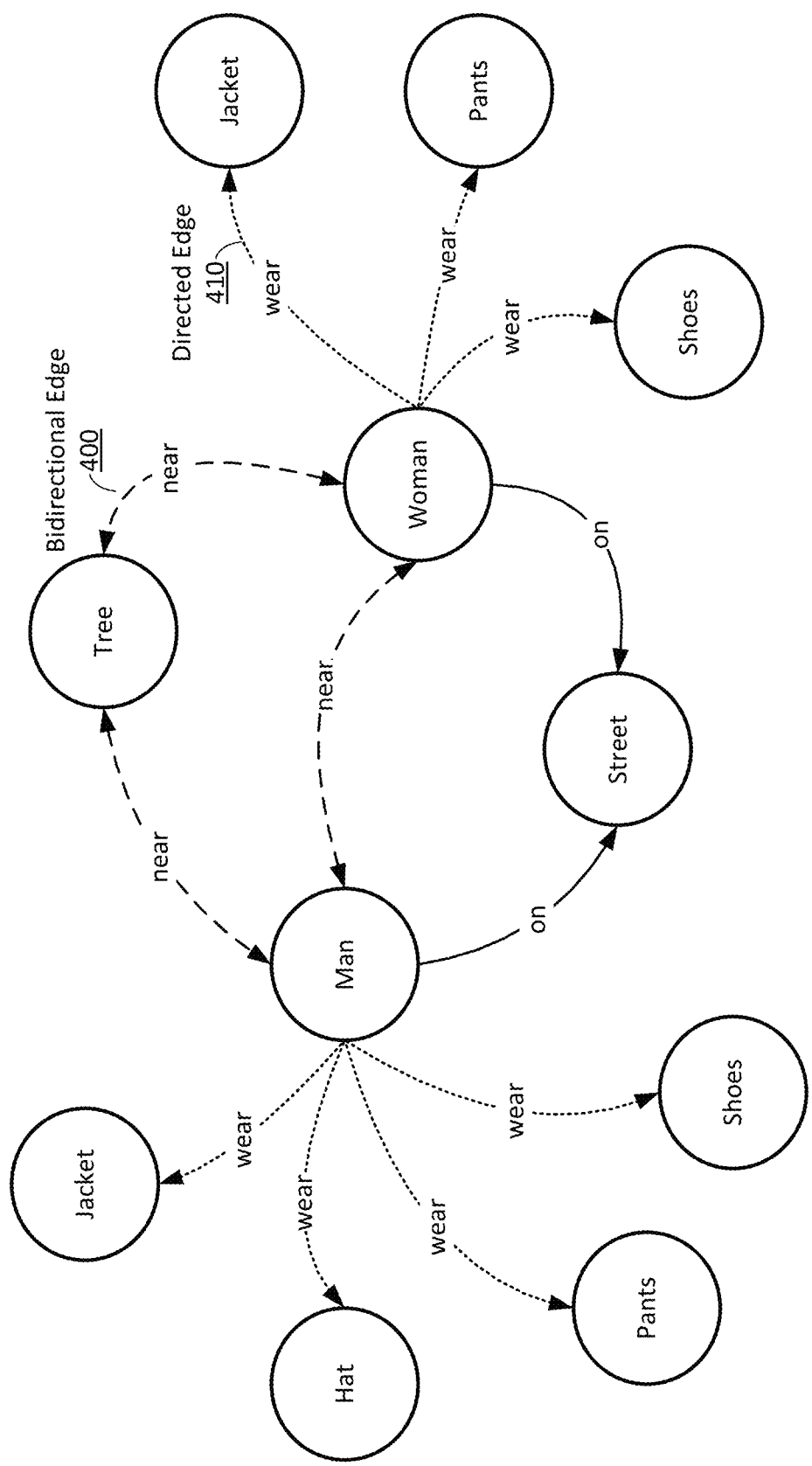
FIG. 4 shows an example of an object relationship graph that may be used during training, according to one embodiment.

FIG. 4 shows an example of an object relationship graph that may be used during training, according to one embodiment. During training, the total loss may be a combination of the object loss and relation loss as noted above. In general, objects that are more connected to other objects may be more important to get right in the prediction of the object relationships, and to be correctly predicted as for its type. As such, in one embodiment, the loss function may adjust the effective weight of a training relationship (i.e., a known object-object relationship in a training image) according to the connectedness of the objects in the relationship. FIG. 4 shows an object relationship graph for various types of objects of a training image, for example, in which a man and woman talk to each other on a street with a tree nearby. Each object in the training image may be represented as a node, such that the connections between the nodes may represent relationships between the objects. Some objects may be more connected than others, indicating that some objects have more relationships to particular objects than others. Some relationship edges may be a directed edge 410, indicating a unidirectional relation, such as "wears" for a person and their clothes, while others may be a bidirectional edge 400, such as a woman near a tree (which may also be correctly described as a "tree near the woman").

In one embodiment, connectedness may be measured according to the number of incoming and outgoing relationships and described as a "degree." Formally, the relationships between nodes may be described by an adjacency matrix A for a given training image, that may provide an alternate representation of the relationship graph of FIG. 4. In the adjacency matrix A, positions along one dimension signify a subject of a relationship and another dimension as an object of a relationship, such that the intersection may preserve subject-object consistency and may be asymmetric. As such, the degree $d_i$ for an object i may combine the "incoming" and "outgoing" relationships of an object: $d_i = d_i^{in} + d_i^{out}$. When computed with respect to an adjacency matrix, the respective "in" and "out" values may be the sum of the corresponding columns or rows:

$$d_i^{in} = \sum_j A_{ij} \quad d_i^{out} = \sum_j A_{ji}$$

To apply the connected degree to training, the relationship loss may combine the degree of each item in the training and apply it to weight the impact of each relationship to the training, such that the higher degree items cause the constituent relationships contribute more highly towards loss gradients in training. In some embodiments, the degree may also be used in combination with a component that weights the contribution of relationships based on the model's confidence of the object class predictions and the object relationship predictions, such that higher prediction confidence contributes lower loss gradients (e.g., a lower weight), while a higher connectedness contributes higher loss gradients (e.g., a higher weight).

Figure 5:
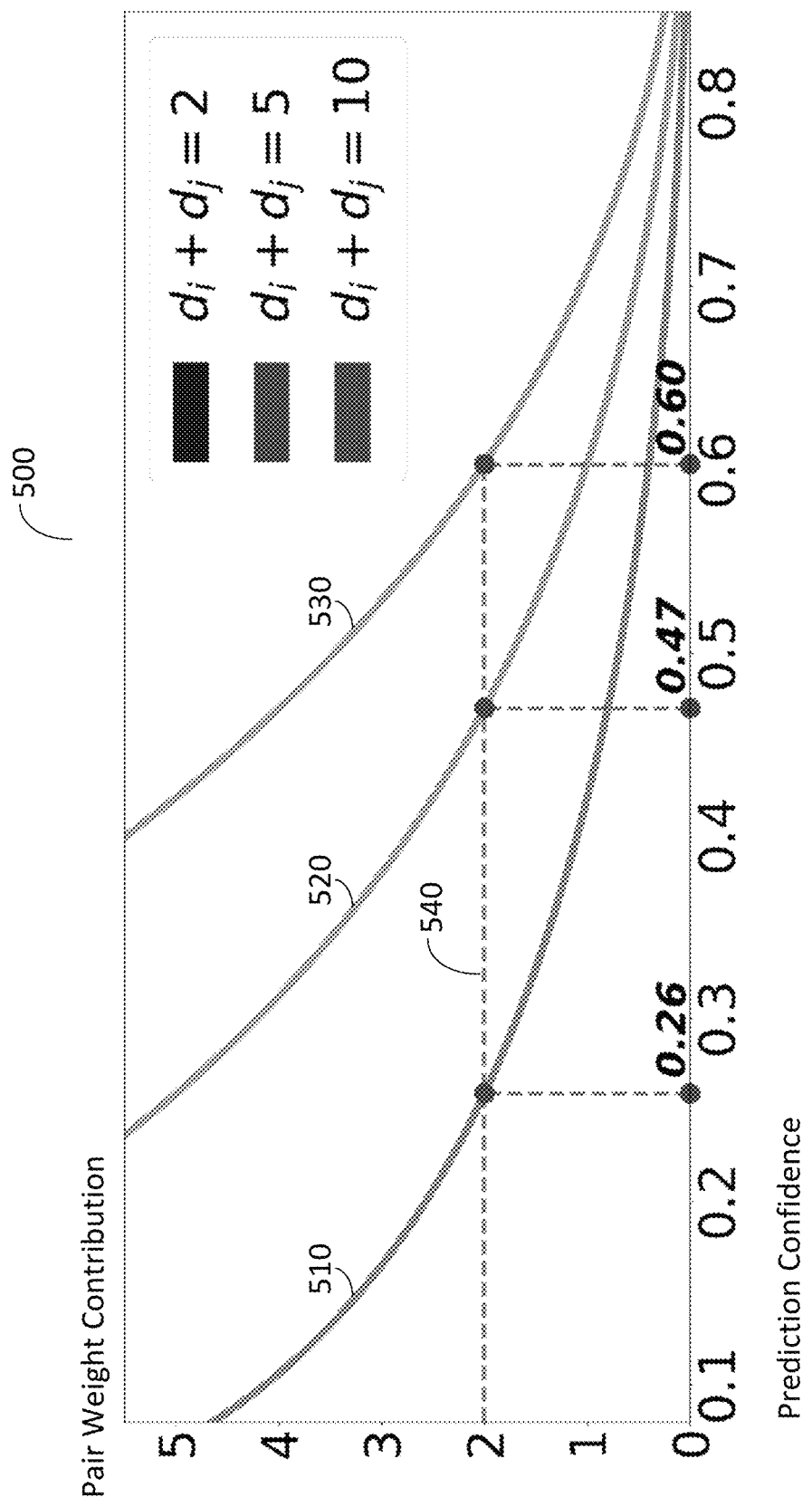
FIG. 5 shows an example graph of the weight contribution to a loss for items of different degrees of connectedness, according to one embodiment.

FIG. 5 shows an example graph 500 of the weight contribution to a loss for items of different degrees of connectedness, according to one embodiment. In training of the relationship loss, the connectedness for the pair may be based on the connectedness of the items in the pair, such that the weight for the pair is $d_i + d_j$. The graph 500 shows the respective weight contributions of a low-confidence pair 510, a medium-confidence pair 520, and a high-confidence pair 530 as the prediction confidence of the relationship pair varies. In this example, the graph 500 shows the effect of a loss equation that combines connectedness of items i and j and a prediction confidence $P_{ij}$:

$$L_{rel} = -(d_i + d_j)(1 - P_{ij}) \log(P_{ij}) \quad \text{Equation 4}$$

in which $d_i + d_j$ provides a term modifying the pair weight contribution, and $(1 - P_{ij})$ provides a term for modifying the weight of the pair ij based on the predicted confidence of the pair (higher weight for lower-confidence). As such, the high-connection, low-confidence pairs have high contribution to the loss, while low-connection, high-confidence pairs have low contribution to the loss. The graph 500 shows these effects, such that each pair, having different connectedness, has the same weight contribution of 2, shown as a line 540, at different prediction confidences, namely at prediction confidence 0.26 for the low-connectedness pair 510, at prediction confidence 0.47 for the medium-confidence pair 520, and at prediction confidence 0.60 for high-connectedness pair 530.

The loss function for training the model may vary in different embodiments, and loss functions may be used that combine connectedness and/or prediction confidence in different ways than Equation 4. Likewise, in different embodiments different functions may be used for the prediction confidence $P_{ij}$. In one embodiment, the prediction confidence $P_{ij}$ may be the prediction of the relationship class of the item. In other embodiments, the prediction confidence may be based on a triplet of the predicted relationship as well as the object class. This triplet prediction confidence may be given in Equation 3 above. Combining the triplet prediction confidence with the connected weighting loss function of Equation 4, and including terms for positive and negative relationship classes, provides a loss function as follows:

$$L_{rel} = \quad \text{Equation 5}$$
$$- \sum_{\substack{(\psi_i, c_{ij}^r, \psi_j) \\ \in GT}} (d_i + d_j)(1 - P(\psi_i, c_{ij}^r, \psi_j)) \log(P(\psi_i, c_{ij}^r, \psi_j))$$
$$- \sum_{\substack{(\psi_i, c^*, \psi_j) \\ \notin GT}} (d_i + d_j)(1 - P(\psi_i, c^*, \psi_j)) \log(P(\psi_i, c^*, \psi_j))$$

in which the first term applies to known relationships in the training image (e.g., for relationships between items as ground truth (GT)), while the second term applies to relationships that are not present in the image, reflecting a relationship class of "no relationship" designated c*. Using Equation 5 in training may thus emphasize learning the relationships for the high-connected objects and allow weights for the high-connected items to reduce after the prediction confidence of those items increases. In this sense, highly-connected pairs may only be considered to be "learned" during training with this approach when the relationship class is highly predicted as well as the underlying object class predictions. Together, this means that the training may emphasize highly-connected nodes initially, and as confidence improves for the highly-connected nodes, the less-connected tail nodes increase weight, enabling the approach to effectively predict both high- and low-connection nodes. When used in conjunction with the triplet prediction confidence (e.g., of Equation 3), the contribution of the object class prediction to the triplet prediction confidence may also provide gradients and signal to the object detection and classification branch, further improving the benefit of joint learning between the object detection and relationship prediction branches. In the example of FIG. 3, these gradients may contribute towards modifying the class prediction in the object heatmap matrix, further improving object detection predictions.

In training the model, each training image may include a number of objects for which the detection may be evaluated with the detection loss, and a number of relationships between objects, for which the relationships may be evaluated with a relationship loss (e.g., based on Equation 5). The positive relationship pairs may be based on the relationships of the training image. As there may be many more negative relationships between items, the negative relationship training pairs may be a subset of the objects for which there is no relationship in the training image, and may be selected at a ratio (e.g., 1:1, 2:1) relative to the positive pairs.

As such, these approaches may provide mechanisms for effectively combining object detection and relationship prediction in a way that permits joint training of the two with a combined loss that jointly improve the object detection and relationship prediction. When evaluated on test data sets, this approach, e.g., using the architecture of FIG. 3 and training loss of FIG. 5, yielded improved performance relative to any other tested model for public benchmarks Visual Relationship Detection (VRD) and Visual Genome (VG).

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A system for image processing with object relationship detection, comprising:
a processor that executes instructions; and
a non-transitory computer-readable medium having instructions executable by the processor for:
determining a set of objects in an image based on an object detection model applied to the image, each object in the set of objects having a predicted object class;
for each object in the set of objects, determining a set of object relationship features based on a portion of a relation feature map of the image and the predicted object class, the relation feature map determined from a set of backbone layers shared with the object detection model; and
for one or more pairs of objects in the set of objects, predicting a relationship class for the pair of objects with a relationship prediction model based on the set of object relationship features of the respective objects.

2. The system of claim 1, wherein the object detection model identifies objects based on a central keypoint of the object.

3. The system of claim 1, wherein the object detection model determines an object class heatmap for an image based on a visual feature map of the image and determines the set of objects based on local peaks of each object class in the object class heatmap.

4. The system of claim 3, wherein the object detection model further determines an offset matrix and a size matrix based on the visual feature map and each object in the set of objects has a bounding box with coordinates determined based on the corresponding position of the local peaks in the offset matrix and the size matrix.

5. The system of claim 1, wherein the object detection model determines objects based on a visual feature map and the relation feature map is based on the visual feature map.

6. The system of claim 1, wherein for the one or more pairs of objects, the relationship prediction model predicts the relationship class with a direction between the objects.

7. The system of claim 1, wherein the instructions are further executable for training the object detection model features jointly with the relationship prediction model.

8. The system of claim 7, wherein parameters of the object detection model and relationship prediction model are continuously differentiable through joint backbone layers shared by the object detection model and the relationship prediction model.

9. The system of claim 7, wherein the relationship prediction model is trained with a loss function for the relationship prediction model that includes a component for the predicted relationship class, a predicted subject object class and a predicted object class.

10. The system of claim 7, wherein a loss function for the relationship prediction model includes a density and confidence-based loss that increases the weight for objects having a relatively high number of relationships to other objects and decreases the weight for relationship predictions having a relatively high confidence of predicted relationship class.

11. A method for image processing with object relationship detection, comprising:
determining a set of objects in an image based on an object detection model applied to the image, each object in the set of objects having a predicted object class;
for each object in the set of objects, determining a set of object relationship features based on a portion of a relation feature map of the image and the predicted object class, the relation feature map determined from a set of backbone layers shared with the object detection model; and
for one or more pairs of objects in the set of objects, predicting a relationship class for the pair of objects with a relationship prediction model based on the set of object relationship features of the respective objects.

12. The method of claim 11, wherein the object detection model identifies objects based on a central keypoint of the object.

13. The method of claim 11, wherein the object detection model determines an object class heatmap for an image based on a visual feature map of the image and determines the set of objects based on local peaks of each object class in the object class heatmap.

14. The method of claim 13, wherein the object detection model further determines an offset matrix and a size matrix based on the visual feature map and each object in the set of objects has a bounding box with coordinates determined based on the corresponding position of the local peaks in the offset matrix and the size matrix.

15. The method of claim 11, wherein the object detection model determines objects based on a visual feature map and the relation feature map is based on the visual feature map.

16. The method of claim 11, wherein for the one or more pairs of objects, the relationship prediction model predicts the relationship class with a direction between the objects.

17. The method of claim 11, the instructions being further for training the object detection model features jointly with the relationship prediction model.

18. The method of claim 17, wherein parameters of the object detection model and relationship prediction model are continuously differentiable through joint backbone layers shared by the object detection model and the relationship prediction model.

19. The method of claim 17, wherein the relationship prediction model is trained with a loss function for the relationship prediction model that includes a component for the predicted relationship class, a predicted subject object class and a predicted object class.

20. The method of claim 17, wherein a loss function for the relationship prediction model includes a density and confidence-based loss that increases the weight for objects having a relatively high number of relationships to other objects and decreases the weight for relationship predictions having a relatively high confidence of predicted relationship class.

* * * * *